7292X
W. LAWRENCE.
Binnacle Lamp.
Patented Nov. 14, 1832.
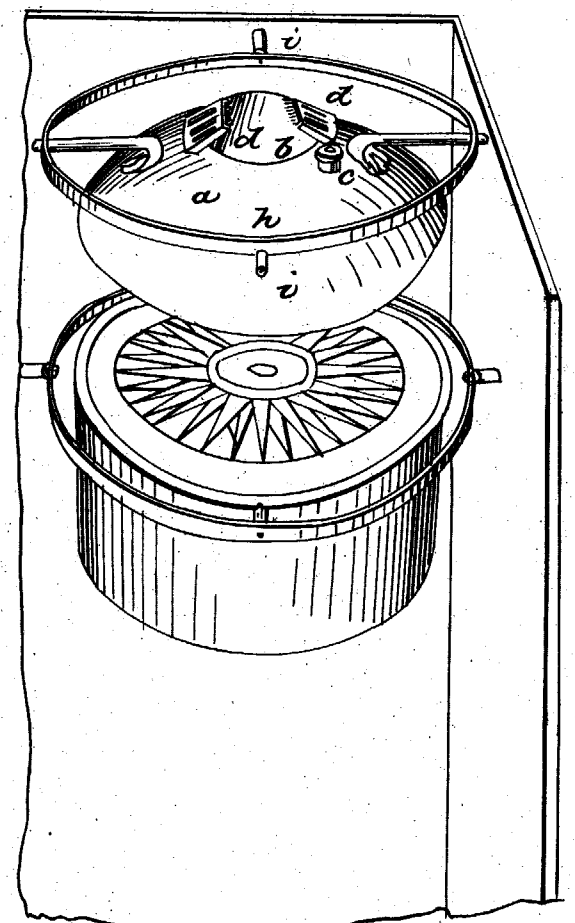
Perspective view of the lamp, with the compass in the binacle.
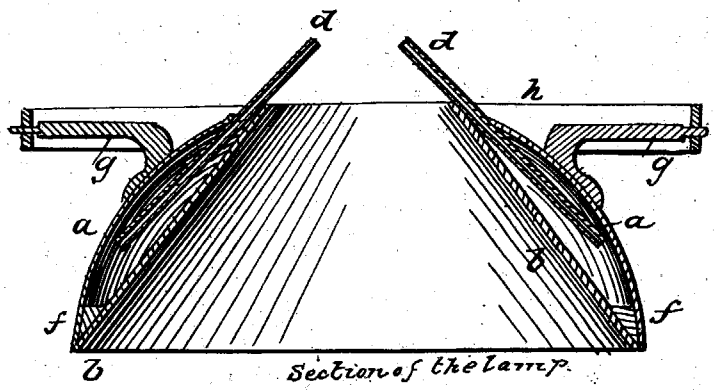
Section of the Lamp.
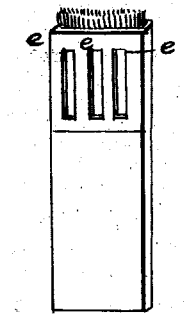
Tube for the wick
N. PETERS, Photo-Lithographer, Washington, D.C.

7292X Nov. 14. 1832

William Lawrence. of Meriden. Connecticut.

Letters Patent.

The schedule referred to in these Letters Patent, and making part of the same containing a description in the words of the said William Lawrence of his improvement in giving light to Binacles called "Lawrence's Binacle Lamp"

To all to whom these presents shall come.

Be it known that I William Lawrence of Meriden in the County of Newhaven and State of Connecticut a native Citizen of said State and of the United States have invented a new & useful improvement in giving light to Binacles which I call "Lawrence's Binacle Lamp" & that the following is a full and exact description of the construction & operation of said machine as invented or improved by me.

I The lamp is composed of two shells the outside shell resembling a bowl, about six inches in diameter & two & a half inches deep with a hole in the bottom about two inches in diameter. The bottom of the bowl turned up is the top of the lamp. The inside shell is of a bell, or trumpet mouth shape, also of about six inches in diameter at the widest opening & of about two inches at the other, so that the openings of the two shells at top and bottom shall exactly correspond & these corresponding edges are to be closely & firmly soldered together forming by the swelling of the outer shell, a cavity for oil. —

Near the open orifice, on the top of the lamp is an opening about half an inch in diameter to pour in oil & may be closed by a cork or screw stopper also on each side of the open orifice on the top are left, or formed, two or more openings about an inch in length and about one eighth of an inch broad, to receive corresponding tubes for wicks, these tubes are about three inches long descending about two inches into the oil chamber and rising over the open orifice in the top about one inch at an angle of about forty five degrees, thereby bringing the blaze of the wicks when inserted in the tubes, directly over the open orifice of the lamp, thro' which the light is diffused downward upon the compass & is increased by reflection from the conical & brilliant sides of the inner shell, These tubes may be made of common tin, shaped to fit the orifices made

7292X for them, having two or more slits in the projecting part of each for the convenience
of moving the wick & may be taken out for its insertion and replaced at pleasure
The body of the lamp or the shells may be made of any suitable me-
-tal from plates or castings, I prefer to cast the shells separate of hardened tin
in moulds & when put together they are turned & well burnished or polished
especially on the inner shell, To preserve the balance of the lamp when filled with oil, a rim of lead
is cast in a ~~[illegible]~~ mould, of a shape exactly fitted to the lower section of the in-
-ner space, between the shells weighing about seventeen ounces, which is inser-
-ted between the shells before they are soldered together.
This will over balance a pound of oil, which it is calculated the cavity may
hold, and the horizontal level of the lamp when hung in the manner here
-inafter specified will thereby always be preserved.
II This lamp is suspended for use, in the same manner & on the same
principle as the mariners compass is usually suspended viz. on two opposite
arms projecting & extending from near the top of the lamp, one on each side &
terminating in pivots inserted into the opposite sides of a circle or hoop, about
seven inches in diameter in which it freely vibrates, which hoop or ring, is
also suspended on two pivots at right angles with the line of the first
described pivots; & these last described pivots are attached to the sides or
cap of the binnacle, or any other proper support.
By means of these pivots, the lamp thus suspended & balanced, di-
-rectly over the compass, will yield to the motion of the ship & always
keep a horizontal position, & diffuse its light downward on the compass
below it. —— I claim as my invention & improvement the peculiar
construction of the lamp as above specified and the application to it, of
the common & well known principle of suspending the mariners com-
-pass, as specified above, whereby the horizontal position of the lamp &
the diffusion of the light down upon the compass, will be preserved & not-
-withstanding the rolling of the vessel, which invention, improvement & applica-
-tion are new & useful & therefore, & to secure the benefit thereof, I solicit Letters
Patent according to law. In testimony whereof I hereunto subscribe my name
in New Haven the 28th September A.D. 18[illegible] - William [illegible]
Witnesses [illegible]

806